United States Patent
Bennison et al.

(10) Patent No.: US 7,665,221 B2
(45) Date of Patent: Feb. 23, 2010

(54) METHOD AND APPARATUS FOR HOLE DIAMETER PROFILE MEASUREMENT

(75) Inventors: Stephen J. Bennison, Bellevue, WA (US); Bruce S. Howard, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 11/442,013

(22) Filed: May 25, 2006

(65) Prior Publication Data

US 2007/0051003 A1 Mar. 8, 2007

(51) Int. Cl.
*G01B 3/00* (2006.01)
*G01B 5/00* (2006.01)

(52) U.S. Cl. .............................. 33/544; 33/542; 33/819; 33/836

(58) Field of Classification Search ........... 33/542–544, 33/544.1, 544.2, 544.3, 544.4, 554, 556–557, 33/559–560, 813, 819, 832–833, 836, 784
See application file for complete search history.

(56) References Cited

U.S. PATENT DOCUMENTS

| | | | | |
|---|---|---|---|---|
| 4,367,592 A | * | 1/1983 | Thompson | 33/542 |
| 4,485,453 A | * | 11/1984 | Taylor | 700/186 |
| 4,636,960 A | * | 1/1987 | McMurtry | 700/193 |
| 4,821,421 A | * | 4/1989 | Girardier et al. | 33/819 |
| 4,843,723 A | * | 7/1989 | Hentschel et al. | 33/555.1 |
| 4,914,826 A | | 4/1990 | Nold, III | |
| 5,171,248 A | | 12/1992 | Ellis | |
| 5,189,808 A | * | 3/1993 | Evans et al. | 33/542 |
| 5,526,576 A | * | 6/1996 | Fuchs et al. | 33/503 |
| 5,729,906 A | * | 3/1998 | Banks et al. | 33/544.1 |
| 6,339,886 B1 | * | 1/2002 | Reinhardt | 33/544.2 |
| 6,862,814 B2 | * | 3/2005 | Bennison et al. | 33/554 |
| 7,337,551 B2 | * | 3/2008 | Roth et al. | 33/559 |
| 7,415,779 B2 | * | 8/2008 | St. Louis et al. | 33/836 |
| 7,448,143 B2 | * | 11/2008 | St. Louis et al. | 33/836 |
| 2004/0117999 A1 | * | 6/2004 | Bennison et al. | 33/554 |
| 2008/0104855 A1 | * | 5/2008 | Kim et al. | 33/836 |

FOREIGN PATENT DOCUMENTS

EP 0379226 7/1990
WO WO 01/98732 12/2001

OTHER PUBLICATIONS

International Search Report for PCT Application No. PCT/US2007/012134.

* cited by examiner

*Primary Examiner*—Yaritza Guadalupe-McCall
(74) *Attorney, Agent, or Firm*—Gates & Cooper LLP (57) ABSTRACT

A method and apparatus for measuring the bore diameter of a hole as a function of hole depth is disclosed. In one embodiment, the apparatus comprises a diametric probe, for generating first measured bore diameter data along a diametric probe sensitive axis; a foot, for positioning the diametric probe sensitive axis in a plane parallel to the hole; a linear distance probe, coupled to the diametric probe, for generating first measured depth data describing the depth of the diametric probe sensitive axis within the hole; and a data acquisition system, for recording first measured bore diameter data from the diametric probe and first measured depth data from the linear distance probe of an insertion of the diametric probe into the hole.

21 Claims, 10 Drawing Sheets

METHOD AND APPARATUS FOR HOLE DIAMETER PROFILE MEASUREMENT

BACKGROUND OF THE INVENTION

1. Field of the Invention

The present invention relates generally to systems and methods for measuring hole bore properties, and specifically to a method and apparatus for measuring the bore diameter of as a function of hole depth.

2. Description of the Related Art

Hundreds of thousands of holes are drilled in commercial and military aircraft and spacecraft. Some of these holes are high tolerance holes with a diameter tolerance band of 0.003 inch. Specifications dictate the measurement requirements of these holes, and they typically mandate the measurement of the maximum and minimum diameter at two orientations in the bore of the hole.

Inspectors currently utilize available hole diameter gages that only report a single diameter in the bore of the hole at an uncontrolled and unmeasured depth in the bore. Currently, inspectors are required to insert the gage into the hole and hunt for the minimum and maximum hole diameter readings. The effort challenges the user since the reading ability of the user is slow compared to the rate of change in hole's bore diameter. Using current techniques, it can take approximately ninety seconds to measure the bore of a single hole, and the results can greatly depend on the skill of the inspector.

Since controlling the rate of descent into the hole is challenging, the true maximum and minimum hole diameters are often missed. Hole diameter specifications also typically dictate that the hole readings be taken within a specific depth distance to the entrance and exit of the hole. Further, part interfaces are typically ignored since these areas do not represent the true drilling process. Without a depth reference, it is not possible to exactly judge what depth the gage is at and hence the specified setback requirements cannot be properly met.

What is needed is a method and apparatus for determining the bore diameter of a hole as a function of the depth of the hole. The present invention satisfies that need.

SUMMARY OF THE INVENTION

To address the requirements described above, the present invention discloses a method and apparatus for measuring the bore diameter of a hole as a function of hole depth. In one embodiment, the apparatus comprises a diametric probe, for generating first measured bore diameter data along a diametric probe sensitive axis; a foot, for positioning the diametric probe sensitive axis in a plane parallel to the hole; a linear distance probe, coupled to the diametric probe, for generating first measured depth data describing the depth of the diametric probe sensitive axis within the hole; and a data acquisition system, for recording first measured bore diameter data from the diametric probe and first measured depth data from the linear distance probe of an insertion of the diametric probe into the hole. In another embodiment, the method comprises the steps of positioning a sensitive axis of a probe assembly in a plane substantially parallel to the hole. The probe assembly comprises a diametric probe, for generating first measured bore diameter data along the diametric probe sensitive access and a linear distance probe, coupled to the diametric probe, for generating first measured depth data describing the depth of the diametric probe sensitive axis within the hole; and inserting the probe assembly into the hole while recording first measured bore diameter data from the diametric probe and first measured depth data from the linear distance probe. Then, the probe assembly is inserted into the hole while recording first measured bore diameter data from the diametric probe and first measured depth data from the linear distance probe.

The foregoing permits hole bore diameter measurements to be taken at two different orientations within 4 seconds instead of the ninety seconds required by previous techniques. The foregoing also reduces operator-induced measurement variation, and provides information on hole quality (roundness and defects), material properties around the hole (layup angle, ply-to-ply layer differences, interfaces), drill wear, and hole shrinkage for composite materials.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
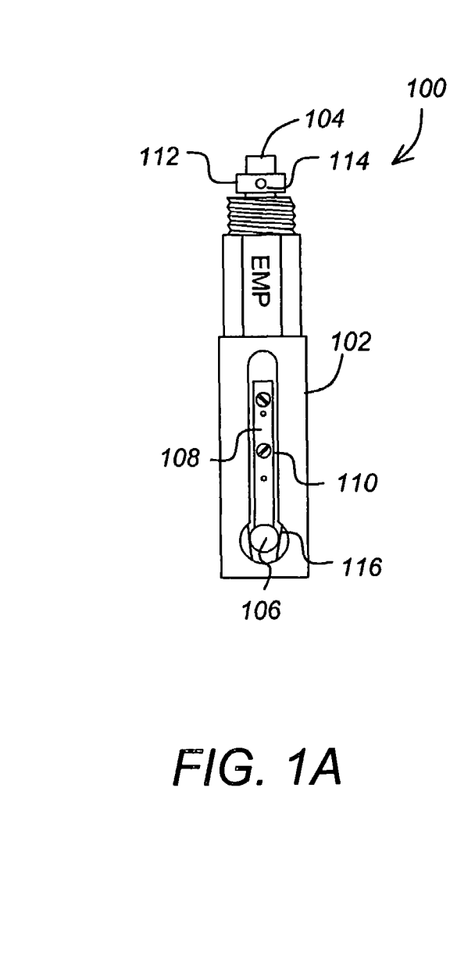
FIG. 1A is a diagram of one embodiment of a diametric probe.

FIG. 1A is a diagram of one embodiment of a diametric probe 100. This embodiment is also known as a gage plug. The diametric probe 100 comprises an elongated rod 104. The elongated rod 104 has a tapered end and a stop collar 112 affixed by one or more stop collar set screw(s) 114. Contact balls 106 are coupled to the elongated rod 104 via leaf springs 108 and fastening devices such as screws 110. The elongated rods also include a ground surface 116 upon which the contact balls 106 rest.

Figure 1B:
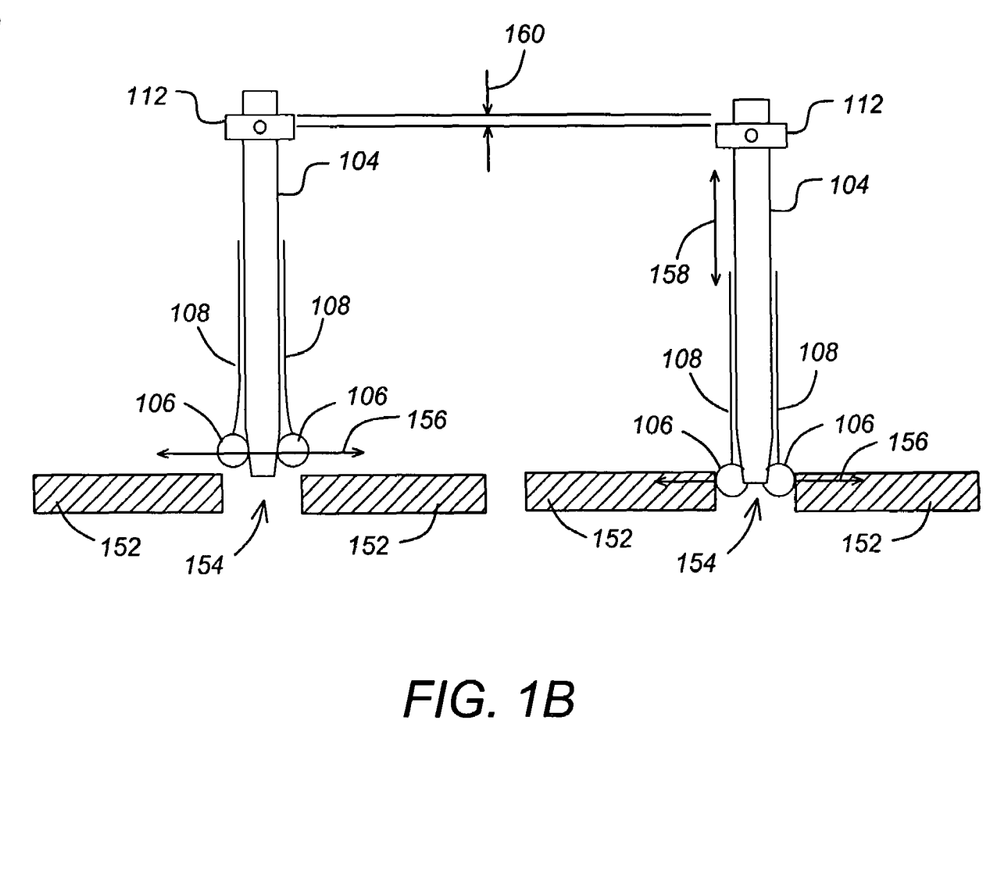
FIG. 1B is a diagram illustrating the function of the diametric probe.

FIG. 1B is a diagram illustrating how the diametric probe 100 shown in FIG. 1A can be used to measure the bore diameter of a hole 154 in a surface 152 along a diametric probe sensitive axis 156. When the diametric probe 100 is inserted into the hole 154, the contact balls 106 are urged inward, and by virtue of the ground surface 116 and their attachment to the elongated rod 104 via leaf springs 108 and screws 110, the elongated rod 104 is urged upwards as shown by arrows 158 in an amount shown by arrows 160. The vertical displacement of the elongated rod 104 can thus be used to determine the diameter of the hole 154 along the diametric probe sensitive axis 156.

Figure 2:
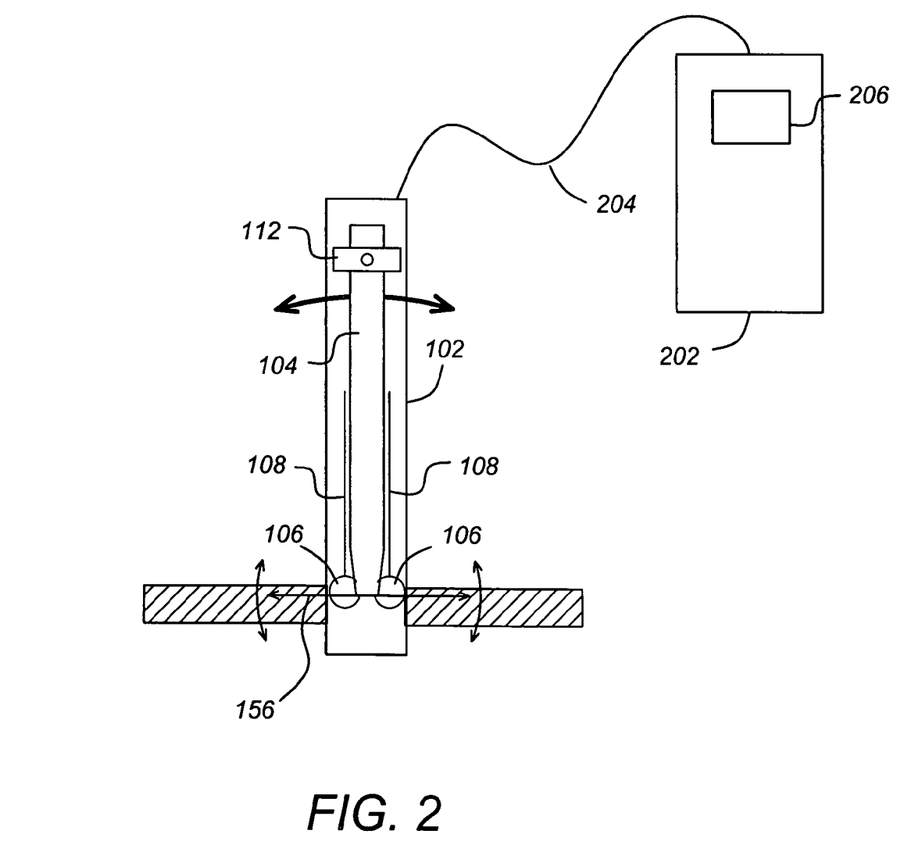
FIG. 2 is a diagram illustrating how the diametric probe is typically used to measure the bore diameter of the hole.

FIG. 2 is a diagram illustrating how the diametric probe 100 is typically used to measure the bore diameter of the hole 154. The diametric probe 100 is communicatively coupled to a readout device 202 via a readout cable 204, and the user simply places the diametric probe body 102 into the hole 154, pushes down, and watches the reading of the diameter on the display 206 of readout device 202. However, since the diameter of the body 102 of the probe 100 is smaller than the diameter of the hole 154, the probe 100 is subject to motion in the direction of the double-sided arrows shown in FIG. 2. As a consequence, the measured hole diameter is compromised. Also, since there is no controlled way to measure depth or even to keep the depth of the probe 100 constant, the measurements say little about the profile of the hole. Further, since the user simply looks at the display 206 and records the value for the diameter, more detailed information regarding the hole profile is not available, and is also not easily stored for future use or troubleshooting.

Figure 3A:
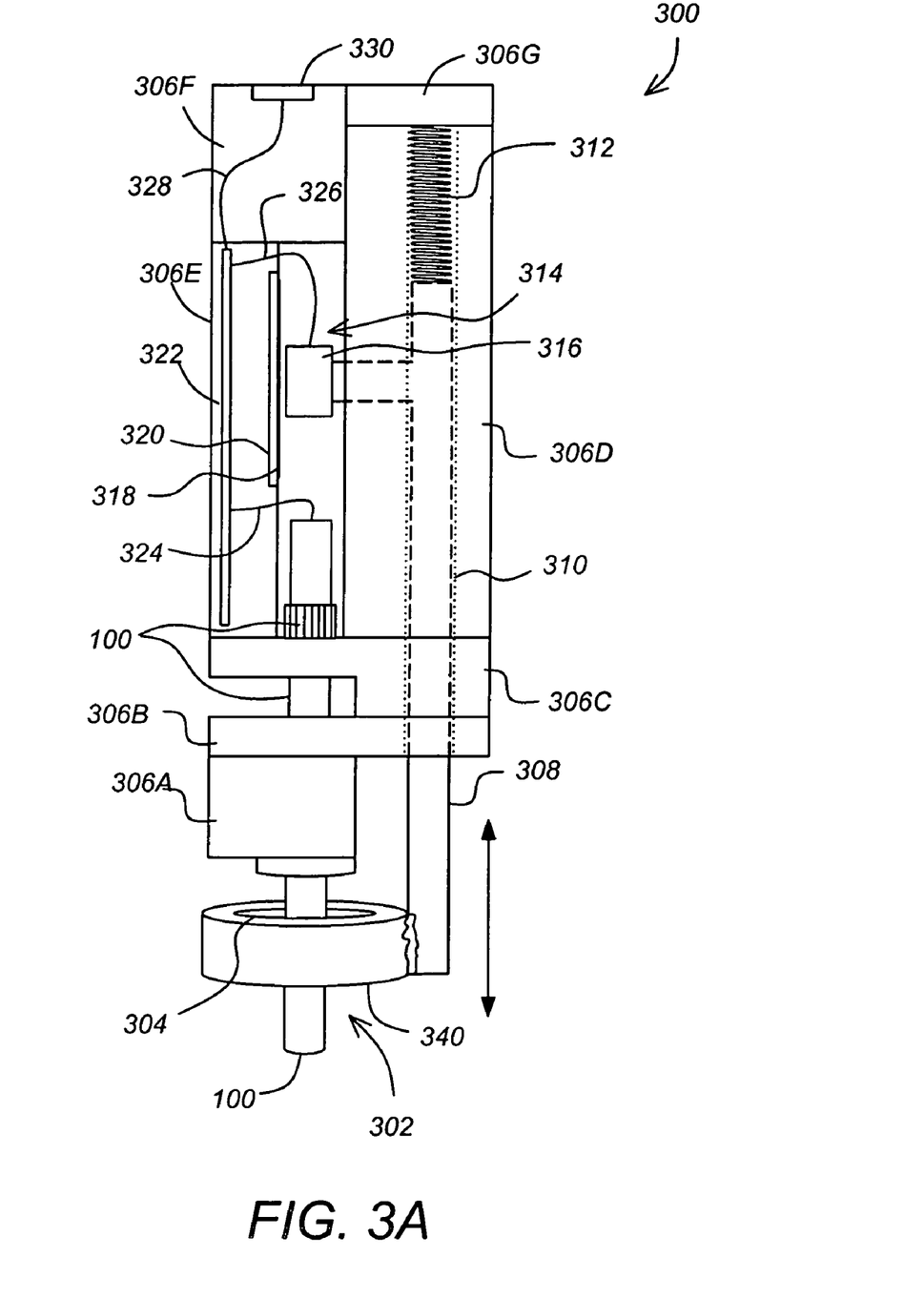
FIGS. 3A and 3B are diagrams depicting one embodiment of a probe assembly that can be used to measure the profile of the hole.
Figure 3B:
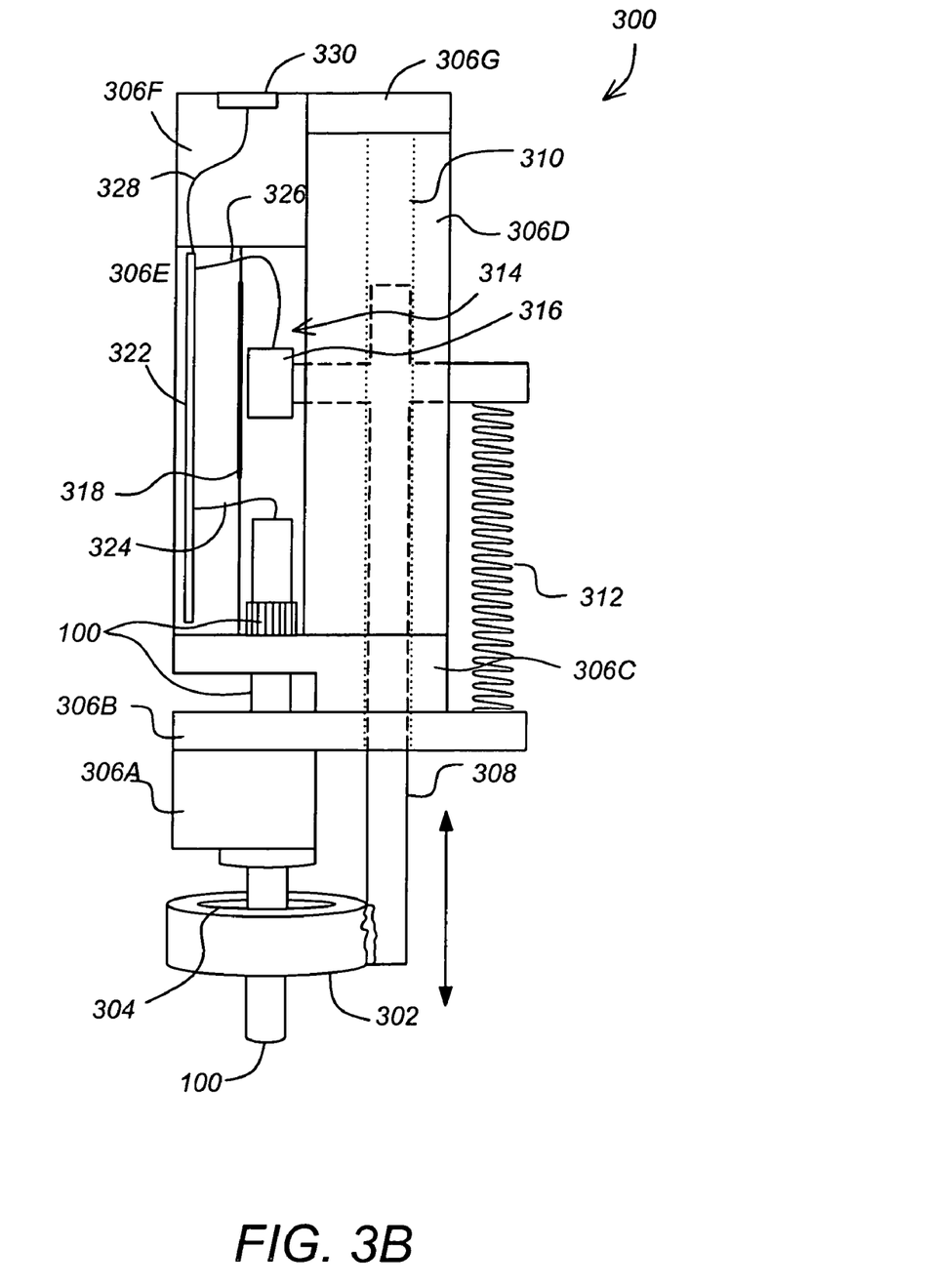

FIG. 3 is a diagram depicting one embodiment of a probe assembly 300 that can be used to measure the profile of the hole 154. The probe assembly 300 comprises the diametric probe 100, a foot 302, and a linear distance probe 314, and a data acquisition system 322. The apparatus also comprises mounting members 306A-306G for interactively coupling the diametric probe 100, the foot 302, and the linear distance probe 314 together in the proper spatial relationships.

As described above, the diametric probe 100 generates measured bore diameter data along sensitive axis 156.

The foot 302 positions the diametric probe sensitive axis 156 in a plane that is parallel to the hole 154 (or the diametric probe 100 perpendicular to the surface 152 through which the hole 154 extends), thus preventing or minimizing the motion shown in FIG. 2. In the illustrated embodiment, the foot 302 comprises an annular member 302 having an orifice 304 through which the diametric probe 100 is disposed. The annular member 302 is coupled to a shaft member 308 having a shank portion that is permitted to move in the direction normal to hole 154 and surface 152 (in the direction of the arrow in FIG. 3A) but is restrained in motion in orthogonal directions.

In the illustrated embodiment, this is accomplished by cooperative interaction of the shaft member 308 and the combined mounting members 306B-306D, which include apertures or channels that in combination, form a passageway 310 for the shaft member 308 to move normal to the surface 152. A spring 312 operates to urge the shank portion (and hence, the foot 302) towards the surface 152.

The probe assembly 300 also comprises a linear distance probe 314 that is mechanically coupled to the foot 302. The linear distance probe 314 measures the position of the foot 302 relative to the diametric probe 100, thus generating measured depth data describing the depth of the diametric probe sensitive axis 156 within the hole 154. In the illustrated embodiment, the linear distance probe 314 comprises an optical scale 318 that is read by an optical sensor 316 mounted to the shank portion (and thus, mechanically coupled to the foot 302). As the foot 302 moves up and down relative to the diametric probe 100, the optical sensor 316 moves up and down along the markings presented by the optical scale 318, thus indicating the position of the diametric probe sensitive axis 156 relative to the foot 302 (and thus, relative to the depth of the diametric probe sensitive axis 156 within the hole 152).

Measured bore diameter data generated by the diametric probe 100 and measured depth data generated by the linear distance probe 314 is provided to a data acquisition system 322 (via connectors 324 and 326, respectively) where it is stored or recorded. In one embodiment, the data acquisition system (DAS) 322 comprises a processor and a memory mounted on one or more circuit boards. Data from the DAS 332 is provided external to the probe assembly 300 via connector 328 and interface 330.

FIG. 3B is a drawing depicting another embodiment of the probe assembly 300. This embodiment functions similarly to that of the embodiment illustrated in FIG. 3A, however, in this embodiment, tension of the spring 312 is used to urge the foot 302 downward instead of the compression used in the embodiment shown in FIG. 3A.

Other embodiments are also possible given the teaching provided herein. For example, structures can be provided that translate the linear motion of the foot 302 into helical or rotational motion. In this embodiment, the linear distance probe would comprise a sensor that measures such rotations to determine the vertical displacement of the foot 302. Further, the vertical displacements of the foot can be measured by other means known in the art.

Figure 4:
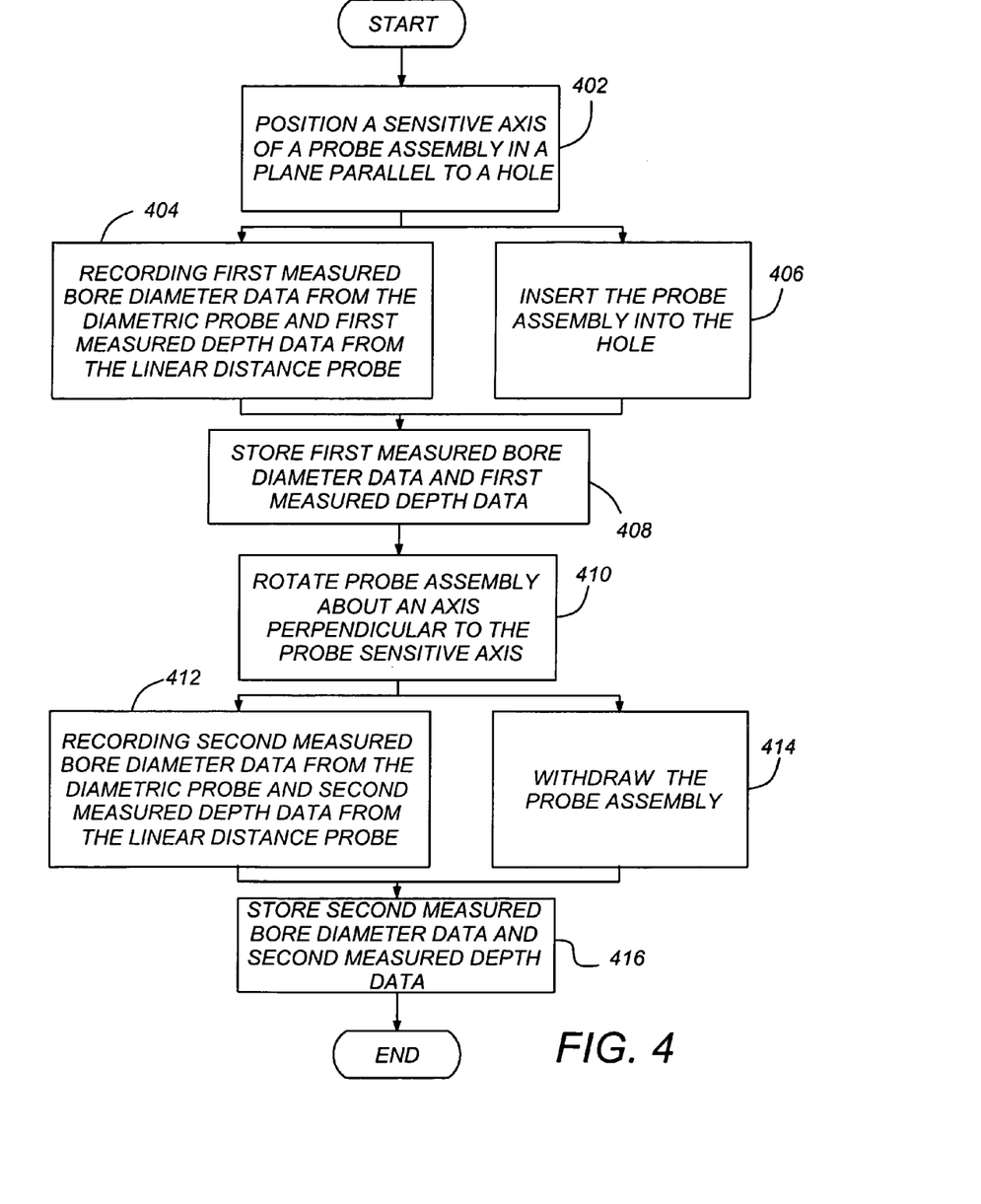
FIG. 4 is a diagram illustrating one embodiment of a method for measuring the bore diameter of a hole as a function of hole depth.

FIG. 4 is a diagram illustrating one embodiment of a method for measuring the bore diameter of a hole as a function of hole depth. First, the sensitive axis 156 of a probe assembly 300 is positioned in a plane parallel to the hole 154, as shown in block 402. This can be accomplished by placing the probe assembly 300 over the hole, with the foot 302 assuring that the sensitive axis 156 is correctly positioned relative to the plane of the hole 154.

Next, the probe assembly 300 is inserted into the hole 154 while recording first measured bore diameter data and measured depth data, as shown in blocks 404 and 406. For example, if the probe assembly 300 of FIG. 3A is used, the probe assembly 300 is placed so that the foot 302 contacts and is placed flush with the surface 152 surrounding the hole 154. The diametric probe 100 is then inserted into the hole 154 by depressing the top of the probe assembly 300. As the diametric probe 100 is inserted further into the hole, the diametric probe 100 measures the bore diameter at the sensitive axis 156 and the linear distance probe 314 measures the depth of the sensitive axis 156. The bore diameter and depth data is then stored as shown in block 408.

In some cases, it is desirable to obtain the bore diameter and depth data at different probe rotation orientations within the hole 154. This is useful in determining whether the hole 154 is truly circular or whether the hole has taken on an ovoid or other shape. If such measurements are desired, the probe can be rotated about an axis perpendicular to the probe sensitive axis 156, as shown in block 408 and additional measurements taken. In the illustrated embodiment, this amounts to rotating the probe assembly (with the diametric probe 100 still inserted all the way through the hole 154) as shown in block 410, and thereafter withdrawing the diametric probe 100 while recording a second set of measured bore diameter data and measured depth data as the probe 100 is withdrawn, as shown in blocks 412 and 414. The second set of measured bore diameter data and measured depth data are then stored, as shown in block 416. The angle of rotation can be any angle desired by the user, but is preferably ninety degrees. Further, the foregoing process can be repeated multiple times, thus obtaining measurements for many different rotations of the diametric probe 100 within the hole 154. To assure measurement-to-measurement repeatability, the probe assembly 300 may include a means to rotate the probe by a fixed amount after each pass through the hole 154. This can be accomplished by a mechanical structure (e.g. a structure imposing mechanical stops with each fixed rotation, or by using a motor assembly or similar structure to controllably drive the desired rotation.

Figure 5:
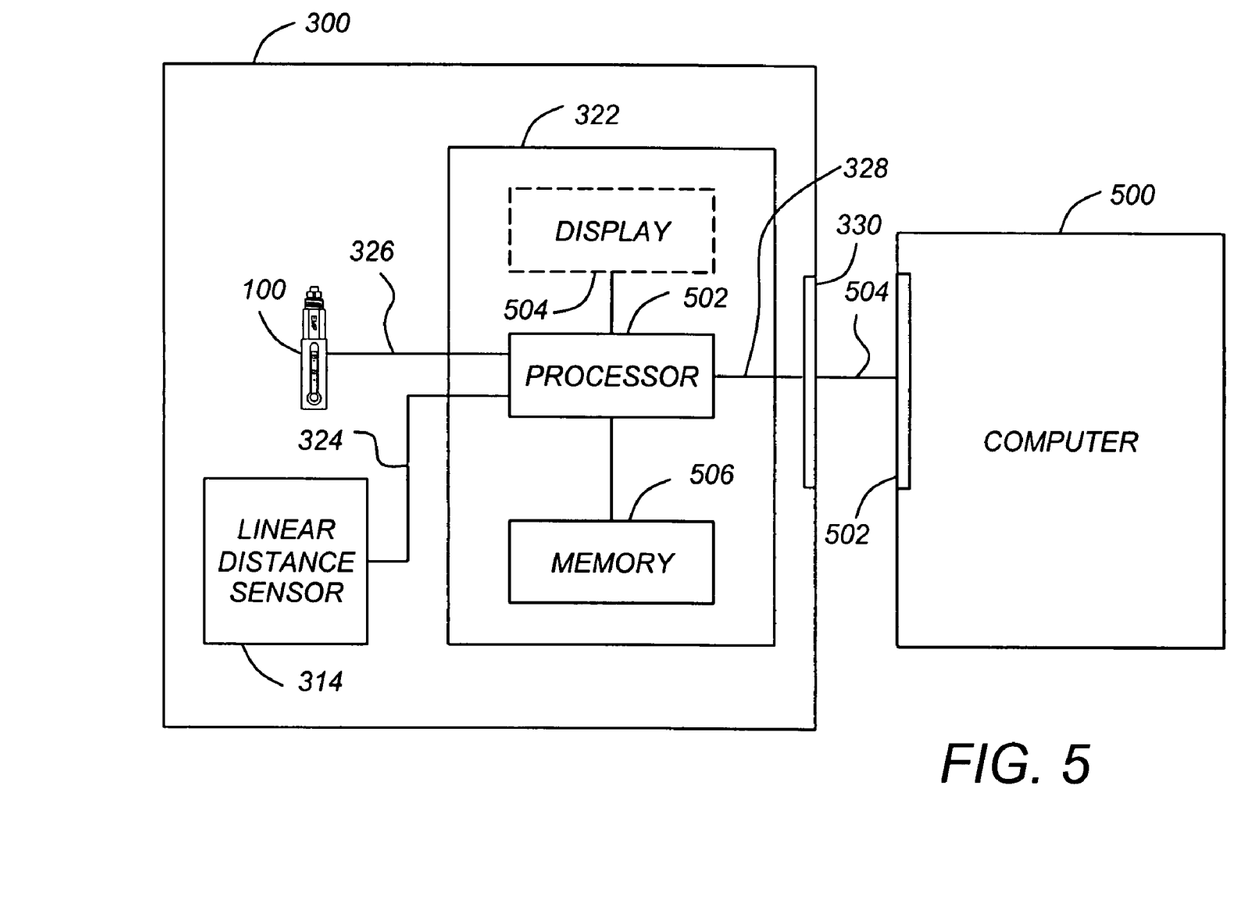
FIG. 5 is a diagram illustrating further details regarding the data acquisition and storage capabilities of the probe assembly.

FIG. 5 is a diagram illustrating further details regarding the data acquisition and storage capabilities of the probe assembly 300. The linear distance probe 314 and the diametric probe 100 are coupled to a processor via paths 326 and 328, respectively. The processor accepts the data, and using instructions stored in the memory 506 or in another memory, stores the measured bore diameter data and the linear distance data in the memory 506. That data can be processed by the processor 502 and provided to a display 504 for user viewing. Alternatively or in addition to the foregoing, the processor 502 may also provide the measured bore diameter data and the linear distance data to a separate computer 500 via path 328, interface 330, umbilical 504 and interface 502.

The data acquisition system 322 may be embodied in an electronic control unit (ECU) of a custom hardware design for high-speed data acquisition, and a custom software application running on an embedded processor such as a microcontroller. The software application is responsible for acquisition, storage and processing of data from two digital, quadrature output, linear encoders located in the gage head. In one embodiment, the microcontroller is the SILICON LABORATORIES C8051F130. Executable code runs from FLASH (electrically erasable, reprogrammable) memory, located within the microcontroller. Software can be written in a combination of assembly language and the 'C' programming language. The gage interface requires no calibration and there need be no accessible controls other than a contrast control for the optional display 504. Additional non-volatile memory can be used to store diametric probe characteristics. The probe assembly 300 can accept interchangeable diametric probes 100, each of which can be electronically serialized so that the data acquisition system 322 can read the identifier and associate the identifier to probe 100 characteristics via data stored in the memory 506.

The hardware and software ensures that data acquired from each probe is stored in memory with the synchronization between the two data sources preserved. In addition, data acquired during the insertion phase of a measurement cycle can be stored separately from data acquired during the withdrawal phase of the measurement cycle. This allows post processing of acquired data from both phases of the measurement cycle.

The measured bore diameter data and the measured depth data can be collected in a number of ways. In one embodiment, the two data values are simply collected according to a common clock. In this way, at least some of the data measurements from each sensor are taken at the same time, allowing diameter measurements to be accurately associated with a depth measurement. In another embodiment, the diameter measurements from the diametric probe 100 are read at a time determined by the depth measurements from the linear distance probe 314. This assures that measurements at particular depths are taken as required. This also permits the bore diameter data to be indexed by the depth data.

The probe assembly 300 can be configured in one of two modes. The first mode (as shown in FIG. 5) the probe assembly 300 is operated in conjunction with an external computer system 500. In this mode, the data acquisition system 322 performs data acquisition and uploads the raw data to the computer system 500 upon completion of each measurement cycle. The host application, running on the computer system 500, then processes the raw data to calculate hole diameter and other hole properties, if so programmed. When used in this mode, there is no requirement for operational user controls or displays. In the second mode, the system performs the post processing of the raw encoder data locally, in the embedded microcontroller or processor 502. The user interface in this mode consists of a "START" switch (not illustrated) and a display 504. Results of the measurement can be displayed locally or uploaded to a data logger or the computer system 500. Connection to the computer system 500 is not required in this mode.

In both operational modes, the connection to the external computer system 500, if present, can be implemented by a Universal Serial Bus (USB) low speed Human Interface Device (HID) interface and protocol. The USB connection also supplies power to the electronics package when the system is connected to the computer system 500. Stand-alone operation can be accommodated by using an auxiliary battery pack, connected to the system by way of a "power only" USB connector. The electronics package hardware and software is designed to minimize power consumption during idle time when operating from battery power.

Figure 6:
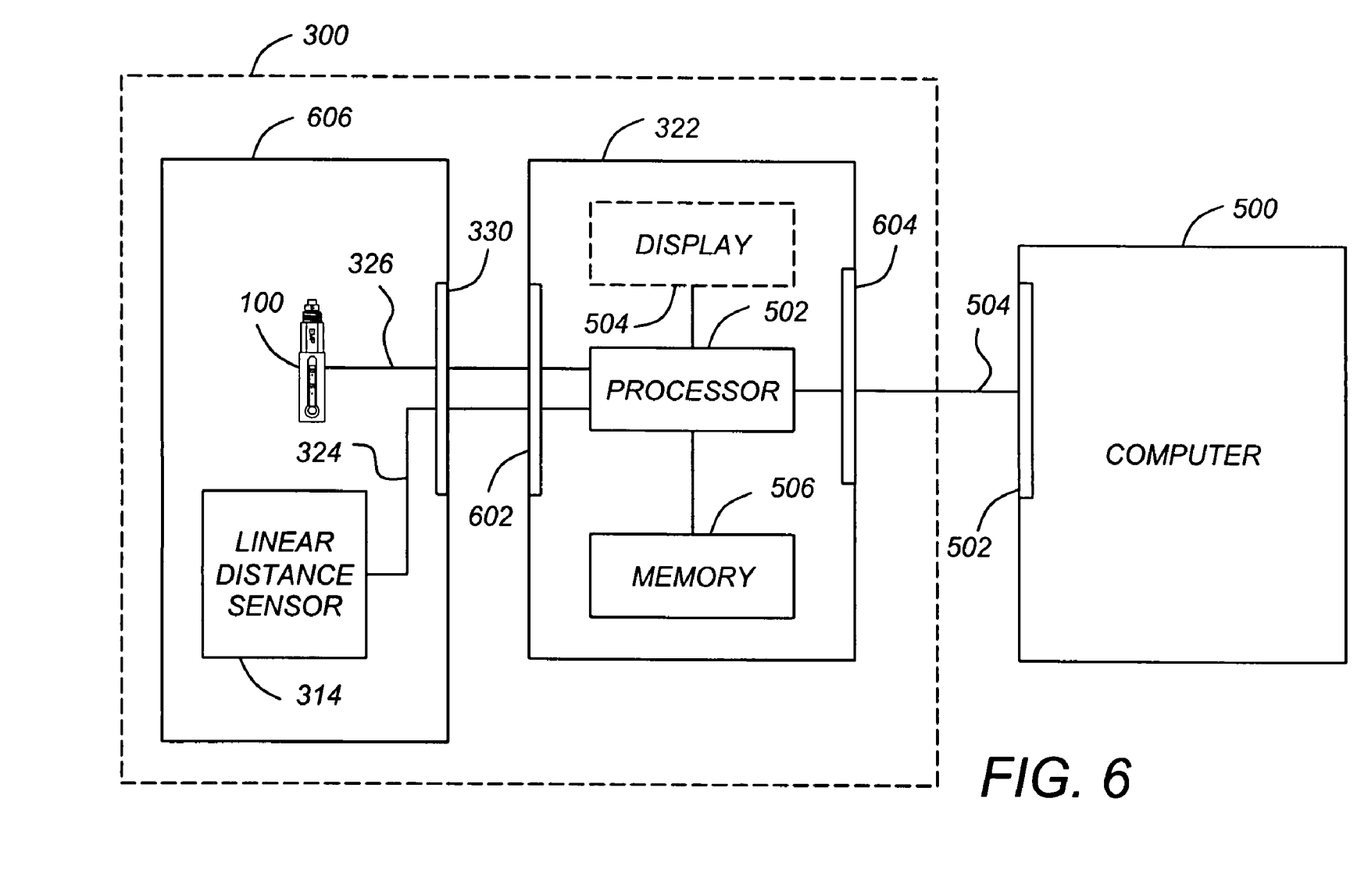
FIGS. 6 and 7 are diagrams depicting further embodiments of the present invention.

FIG. 6 is a diagram depicting another embodiment of the present invention. This embodiment is similar to the embodiment of FIG. 5, however in this embodiment, the data acquisition system is external to the probe package 606 housing the diametric probe 100 and the linear distance probe 314. This embodiment includes additional interfaces including an interface 603 between the probe package 606 and the data acquisition system 322 and an interface 604 between the data acquisition system 322 and the computer system 500.

Figure 7:
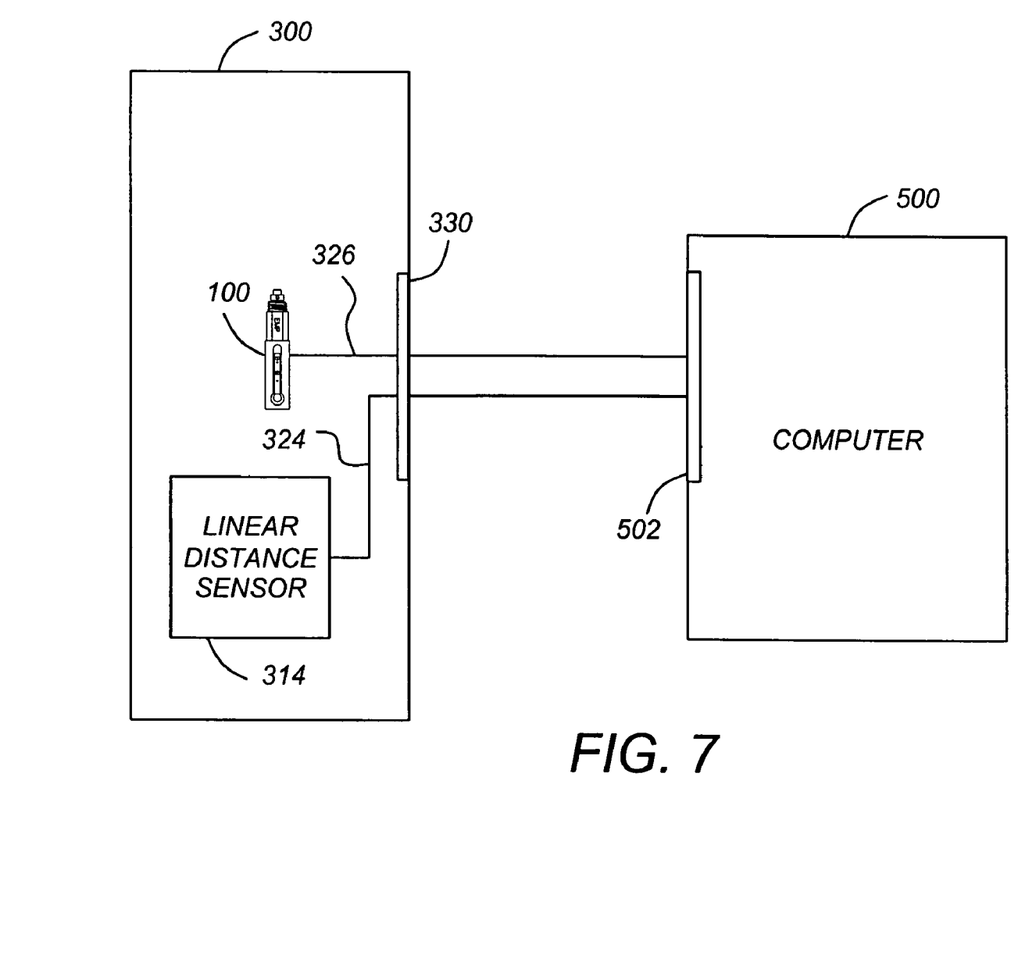

FIG. 7 is a diagram depicting another embodiment of the present invention. In this invention, data is provided directly from the probe package 606 to the computer system 500 for processing.

Figure 8:
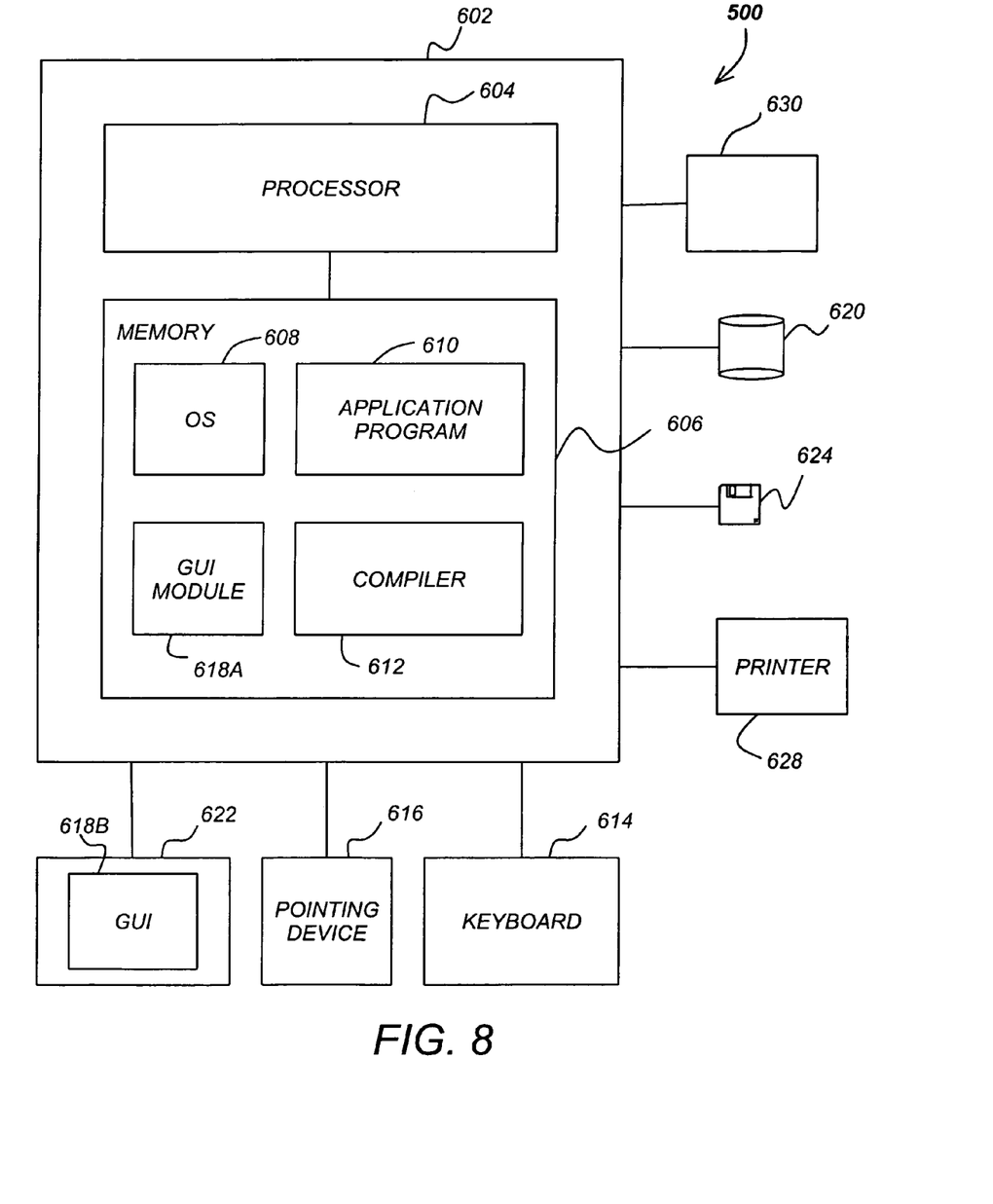
FIG. 8 is an illustration of an exemplary computer system.

FIG. 8 illustrates an embodiment of the computer system 500. The computer system 500 comprises a computer 802 having a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818A is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 102, cause the computer 802 to perform the steps necessary to implement and/or use the present invention. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" as used herein are intended to encompass a computer program accessible from any computer readable device or media.

Figure 9:
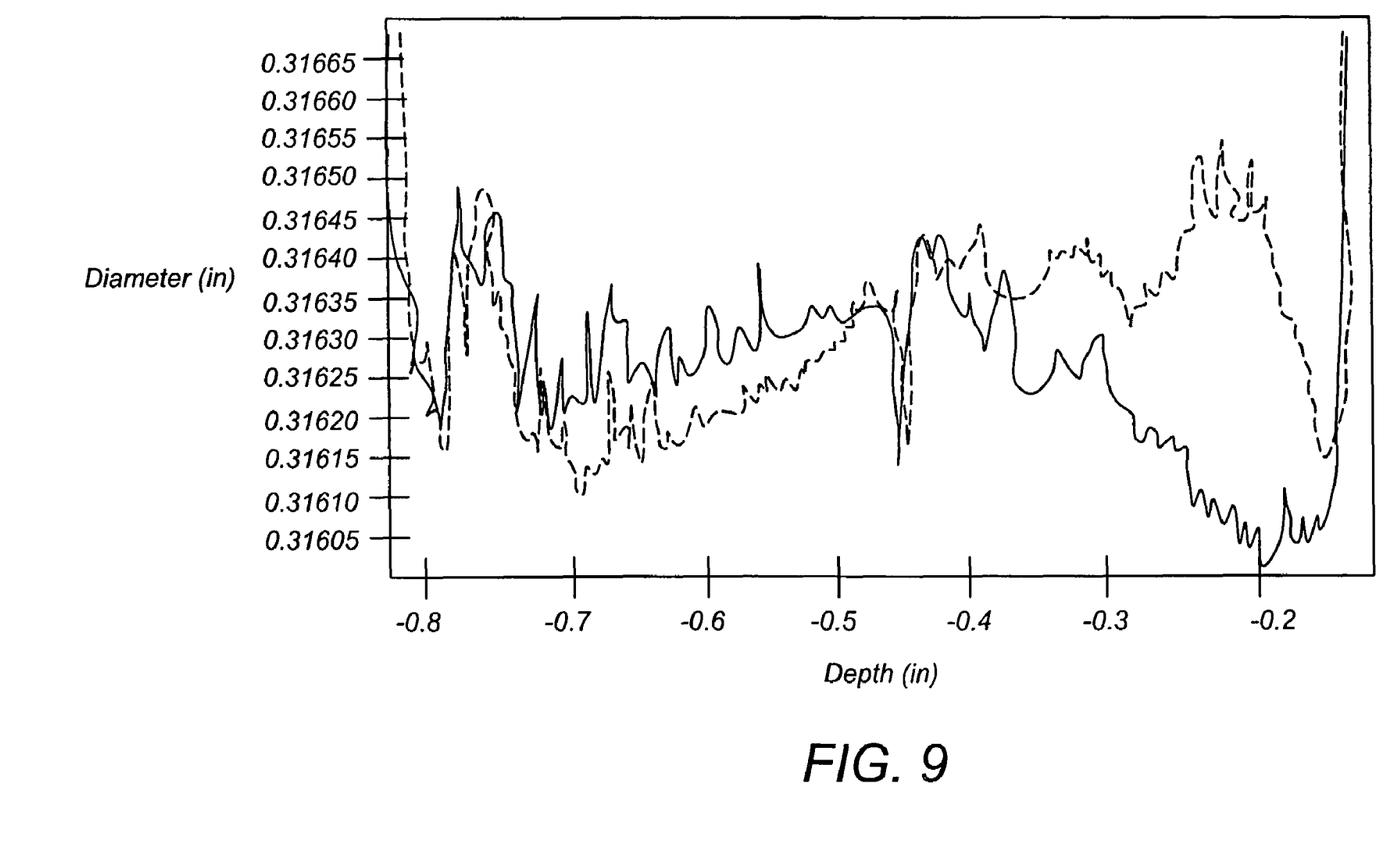
FIG. 9 is an exemplary plot of hole diameter measurements.

FIG. 9 is a diagram of an exemplary plot of hole 154 diameter measurements versus the depth of the hole. The solid line is a plot of the hole 154 diameter measurements taken during the first (insertion) measurement phase, while the dashed line is a plot of the hole 154 diameter measurements taken after the rotation and during the second (withdrawal) measurement phase. Note that near 0.0 cm and 0.8 depths, the measurement increase asymptotically, indicating that the sensitive axis 156 was near the entrance (e.g. the top) of the hole 154 and near the exit (e.g. the bottom) of the hole 154 when the measurements were taken.

The data shown in FIG. 9 can be processed to generate an "average" hole diameter by simply averaging the data values from each measurement phase or to generate an indication of the ovoid shape of the hole 154 by comparing the measurements taken during the insertion phase with those taken during the withdrawal phase (each representing the minor/major axis of the ovoid shape). For holes 154 drilled in composites or other materials having layered structures, the measurements can also be processed to identify layer thicknesses, using the peaks and valleys the plots.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for measuring a bore diameter of a hole as a function of hole depth, comprising:

bore diameter measurement means for generating first measured bore diameter data along a diametric probe sensitive axis;

positioning means for positioning the diametric probe sensitive axis in a plane parallel to the hole;

depth measuring means rigidly coupled to the bore diameter measurement means, for generating first measured depth data describing the depth of the diametric probe sensitive axis within the hole while inserting the bore diameter measurement means into the hole; and data acquisition means coupled to the bore diameter measurement means and the depth measuring means for simultaneously recording first measured bore diameter data from the bore diameter measurement means and first measured depth data from the depth measuring means while inserting the bore diameter measurement means into the hole.

2. The apparatus of claim 1, wherein:

the bore diameter measurement means for generating first measured bore diameter data along a diametric probe sensitive axis comprises a diametric probe;

the positioning means for positioning the diametric probe sensitive axis in a plane parallel to the hole comprises a foot;

the depth measuring means for generating first measured depth data describing the depth of the diametric probe sensitive axis within the hole comprises a linear distance probe; and the data acquisition means for recording first measured bore diameter data from the diametric probe and first measured depth data from the linear distance probe of an insertion of the diametric probe into the hole comprises a data acquisition system.

3. The apparatus of claim 2, wherein the data acquisition system further records second measured bore diameter data from the diametric probe and second measured depth data from the linear distance probe during a subsequent withdrawal of the diametric probe from the hole.

4. The apparatus of claim 3, wherein the data acquisition system stores the second measured bore diameter data and second measured depth data separately from the first measured bore diameter data and the first measured depth data.

5. The apparatus of claim 2, wherein:

the diametric probe is one of a plurality of interchangeable diametric probes having different gage head characteristics; and the data acquisition system reads an identifier of the interchangeable diametric probes.

6. The apparatus of claim 3, wherein the diametric probe is rotated about an axis perpendicular to the probe sensitive axis prior to withdrawal of the diametric probe from the hole.

7. The apparatus of claim 6, wherein the first measured bore diameter data is indexed by the first measured depth data.

8. The apparatus of claim 6, wherein the data acquisition system records the first measured bore diameter at a time determined by the first measured depth data.

9. A method for measuring a bore diameter of a hole as a function of hole depth, comprising the steps of:

positioning a sensitive axis of a probe assembly in a plane substantially parallel to the hole, wherein the probe assembly comprises:

a diametric probe, for generating first measured bore diameter data along the sensitive axis; and a linear distance probe, rigidly coupled to the diametric probe, for generating first measured depth data describing the depth of the sensitive axis within the hole while inserting the diametric probe into the hole;

inserting the probe assembly into the hole while recording first measured bore diameter data from the diametric probe and first measured depth data from the linear distance probe.

10. The method of claim 9, further comprising the step of: withdrawing the probe assembly from the hole while further recording second measured bore diameter data from the diametric probe and second measured depth data from the linear distance probe.

11. The method of claim 10, wherein the diametric probe is rotated about an axis perpendicular to the sensitive axis prior to withdrawal of the diametric probe from the hole.

12. The method of claim 11, wherein the first measured bore diameter data is indexed by the first measured depth data.

13. The method of claim 11, wherein the first measured bore diameter is recorded at a time determined by the first measured depth data.

14. The method of claim 10, further comprising the step of: storing the second measured bore diameter data and second measured depth data separately from the first measured bore diameter data and the first measured depth data.

15. The method of claim 10, wherein the probe assembly further comprises:
a foot, for positioning the diametric probe sensitive axis in a plane parallel to the hole.

16. An apparatus for measuring a bore diameter of a hole as a function of hole depth, comprising:
means for positioning a sensitive axis of a probe assembly in a plane substantially parallel to the hole, wherein the probe assembly comprises:
means for generating first measured bore diameter data along the sensitive axis; and
means for generating first measured depth data describing the depth of the sensitive axis within the hole while inserting the bore diameter measurement means into the hole, wherein the means for generating the first measured depth data is rigidly coupled to the means for generating the first measured more diameter data along the sensitive axis;
means for inserting the probe assembly into the hole while recording first measured bore diameter data from the diametric probe and first measured depth data from the linear distance probe.

17. The apparatus of claim 16, further comprising:
means for withdrawing the probe assembly from the hole while further recording second measured bore diameter data from the diametric probe and second measured depth data from the linear distance probe.

18. The apparatus of claim 17, wherein the diametric probe is rotated about an axis perpendicular to the probe sensitive axis prior to withdrawal of the diametric probe from the hole.

19. The apparatus of claim 18, wherein the first measured bore diameter data is indexed by the first measured depth data.

20. The apparatus of claim 18, wherein the data acquisition system records the first measured bore diameter at a time determined by the first measured depth data.

21. The apparatus of claim 17, further comprising:
means for storing the second measured bore diameter data and second measured depth data separately from the first measured bore diameter data and the first measured depth data.

* * * * *